United States Patent

[11] 3,625,268

[72] Inventor Carl Kempe
 Ornskoldsvik, Sweden
[21] Appl. No. 9,391
[22] Filed Feb. 6, 1970
[45] Patented Dec. 7, 1971
[73] Assignees Canadian International Paper Company;
 Quebec North Shore Paper Company
 Montreal, Quebec; Abitibi St. Anne Paper
 Ltd., Beaupre, Quebec, Canada, part
 interest to each
[32] Priority May 20, 1966
[33] Canada
[31] 960,903
 Continuation of application Ser. No.
 639,883, May 19, 1969, now abandoned.
 This application Feb. 6, 1970, Ser. No.
 9,391

[54] FELLING HEAD RECIPROCATING BLADE TYPE
 77 Claims, 15 Drawing Figs.
[52] U.S. Cl. ................................................. 144/34,
 83/646
[51] Int. Cl. ............................................... A01g 23/08
[50] Field of Search ........................................ 144/3, 3 D,
 34, 34 E, 309 AC, 2 Z; 30/228, 237, 239; 83/646

[56] References Cited
 UNITED STATES PATENTS
 2,529,934 11/1950 Gracey et al................. 144/34 E
 2,697,459 12/1954 McFaull........................ 144/34 E
 3,270,787 9/1966 Rehnstrom.................... 144/34 E
 3,277,936 10/1966 Larson.......................... 144/34 E
 3,294,131 12/1966 Larson.......................... 144/34 E Primary Examiner—Francis S. Husar
Attorney—Craig, Antonelli & Hill ABSTRACT: A tree feller skidder comprising a mobile, self-propelled unitary vehicle, including a tracked undercarriage having a platform on which is mounted an operator's station for effecting operation of the vehicle and various components mounted thereon. The components mounted thereon include an extendible and retractable variable-reach boom mounted for slewing about a vertical axis and having a felling head pivotally attached to the free end thereof, pivotal movement being about a horizontal axis and controlled by a hydraulic motor. The felling head consists of a grapple and shear mounted in fixed spaced relation relative to one another and each has jaw members movable in a direction toward and away a plane passing between the jaw members. The grapple grasps a vertical standing tree and the shear located therebelow severs the tree from its stump, the grapple and shear jaws being controlled by respective ones of two different hydraulic actuators. The shear includes a pair of shear blades mounted on a frame, each by a link member and one further pivotal connection, the latter, in one form, consisting of a cam and cam follower respectively, a slot in the frame and a pin on the respective shear blade or holder therefor. A further component mounted on the vehicle consists of a bunk for anchoring the end of the felled trees to the vehicle and includes an upwardly facing jaw controlled from the operator's station, the jaw being defined by a plurality of arcuate arms pivotally mounted and spaced longitudinally along the length of the bunk between a pair of upstanding posts.

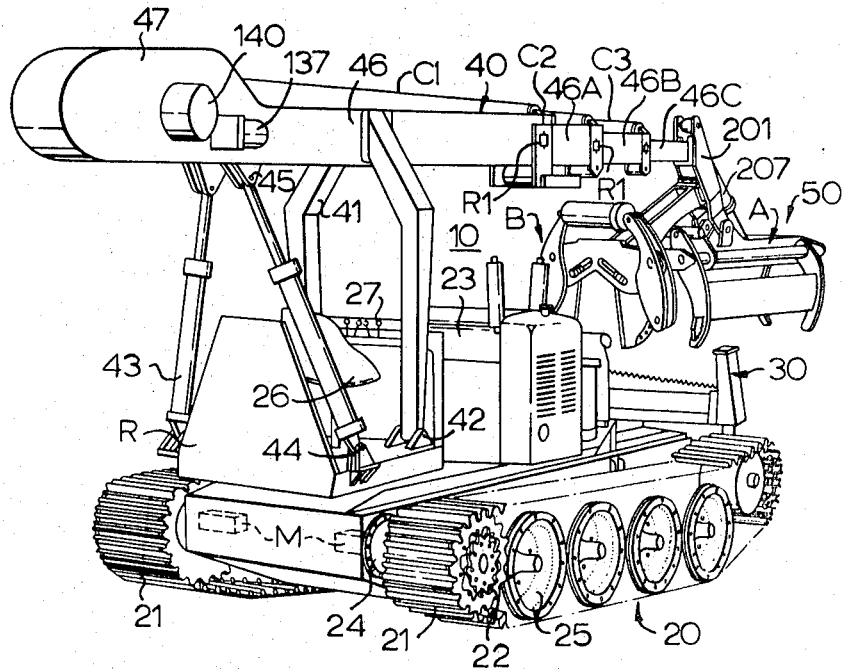
FIG. 1.
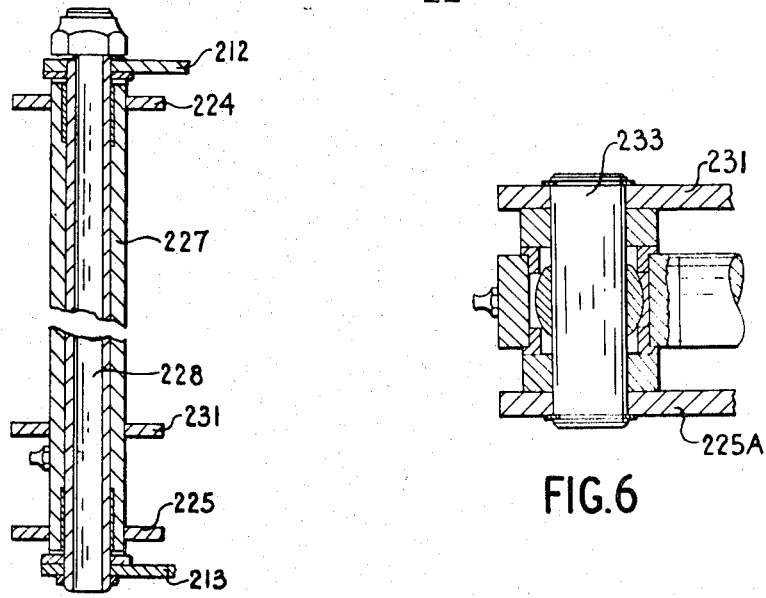
FIG. 5.
FIG. 6.
INVENTOR
CARL KEMPE

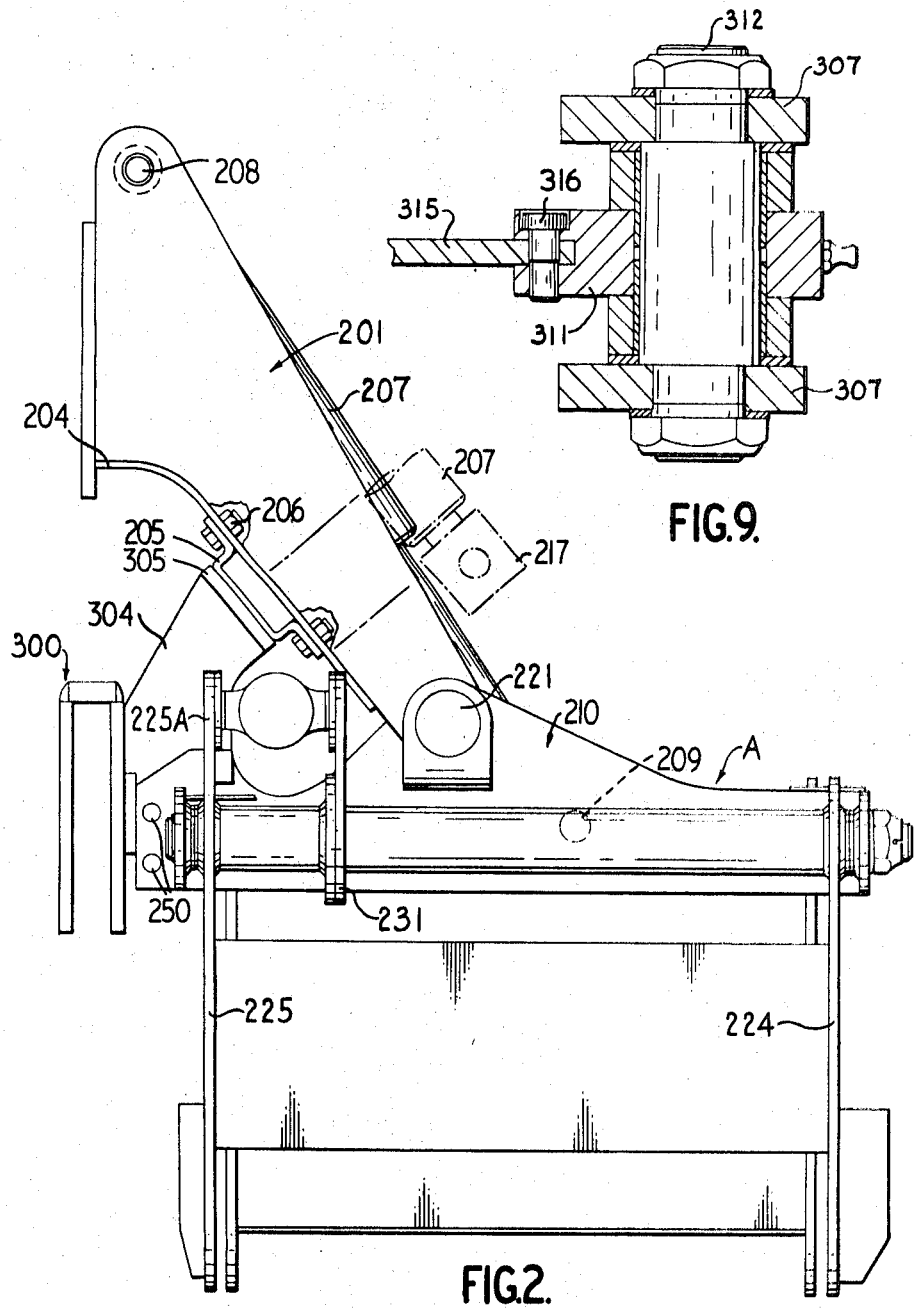

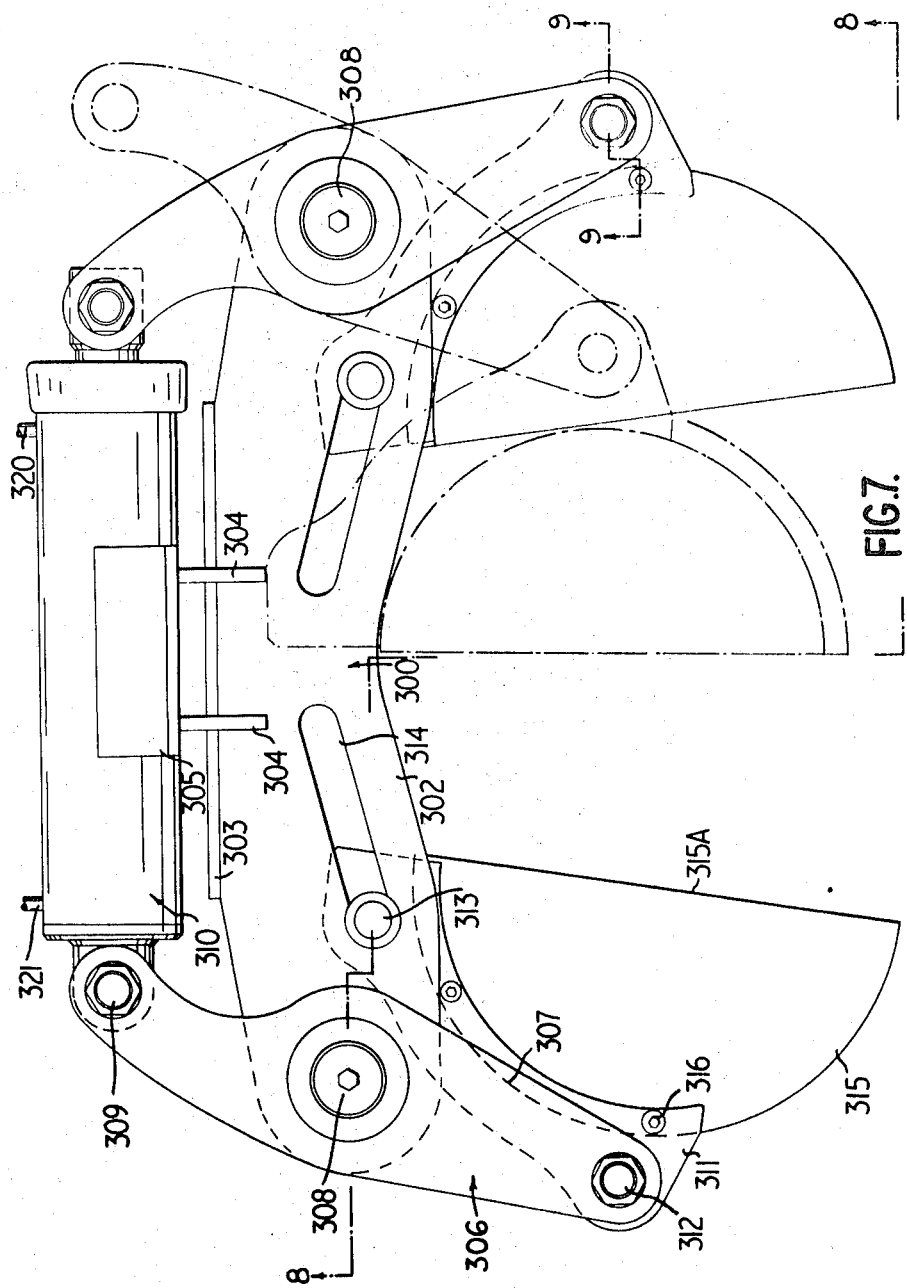

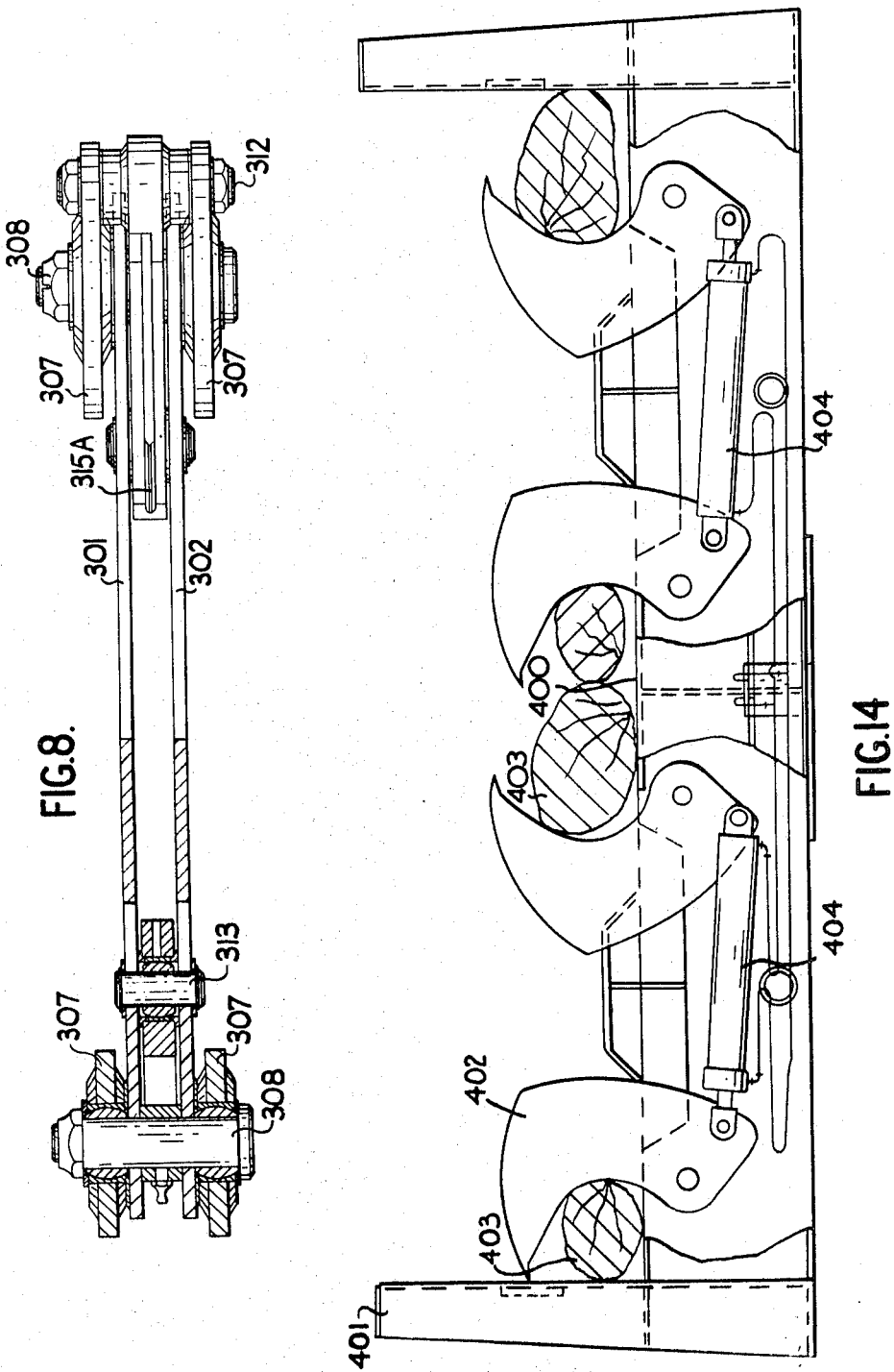

INVENTOR
CARL KEMPE

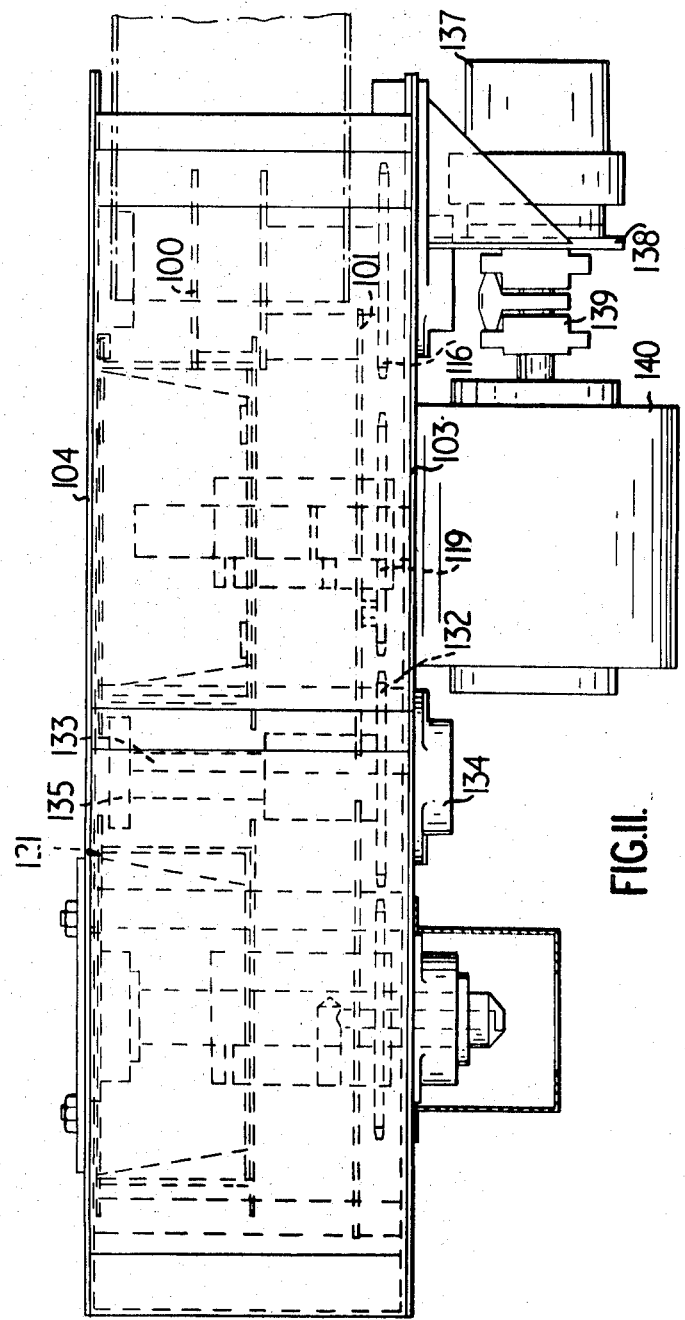

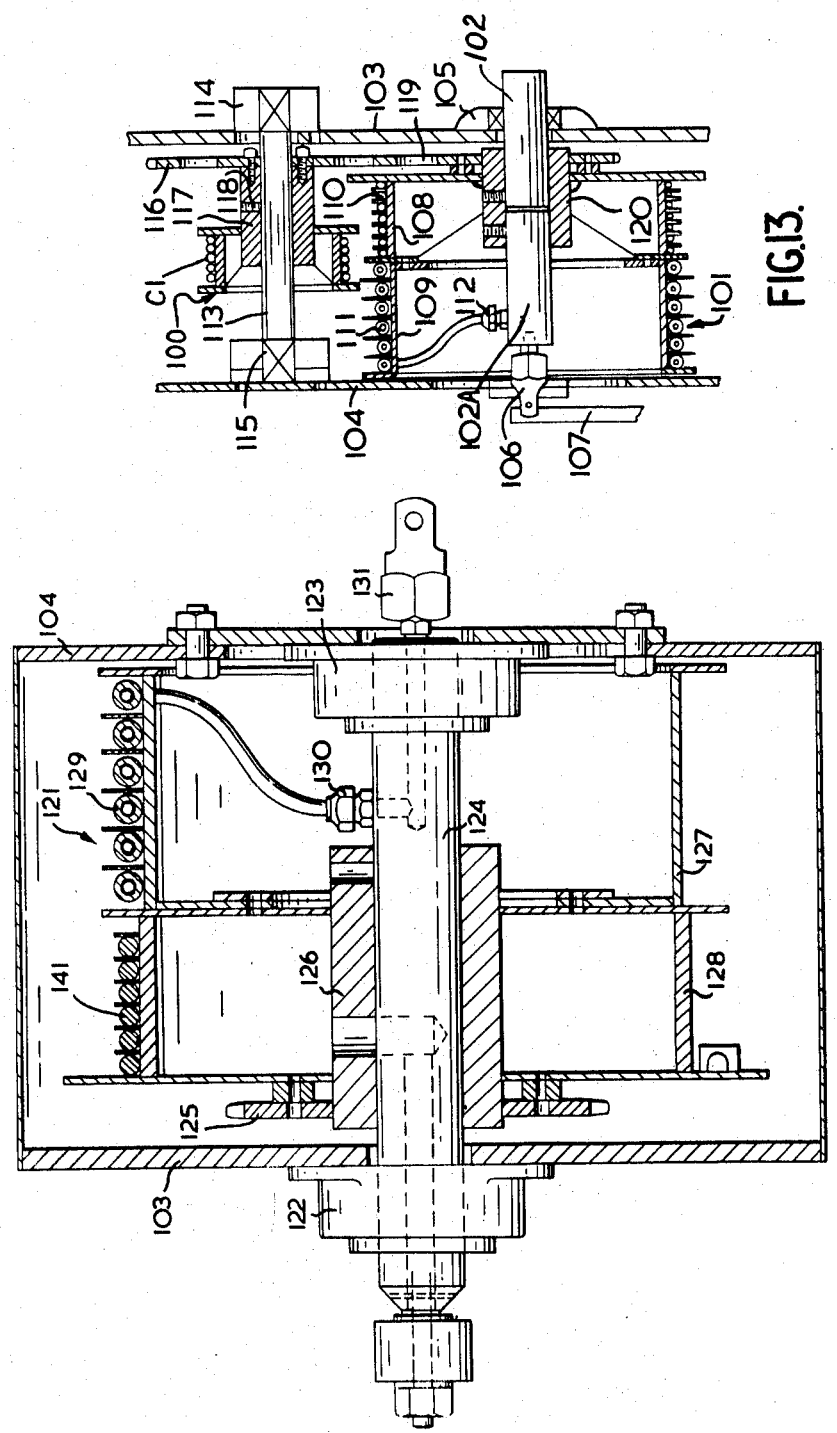

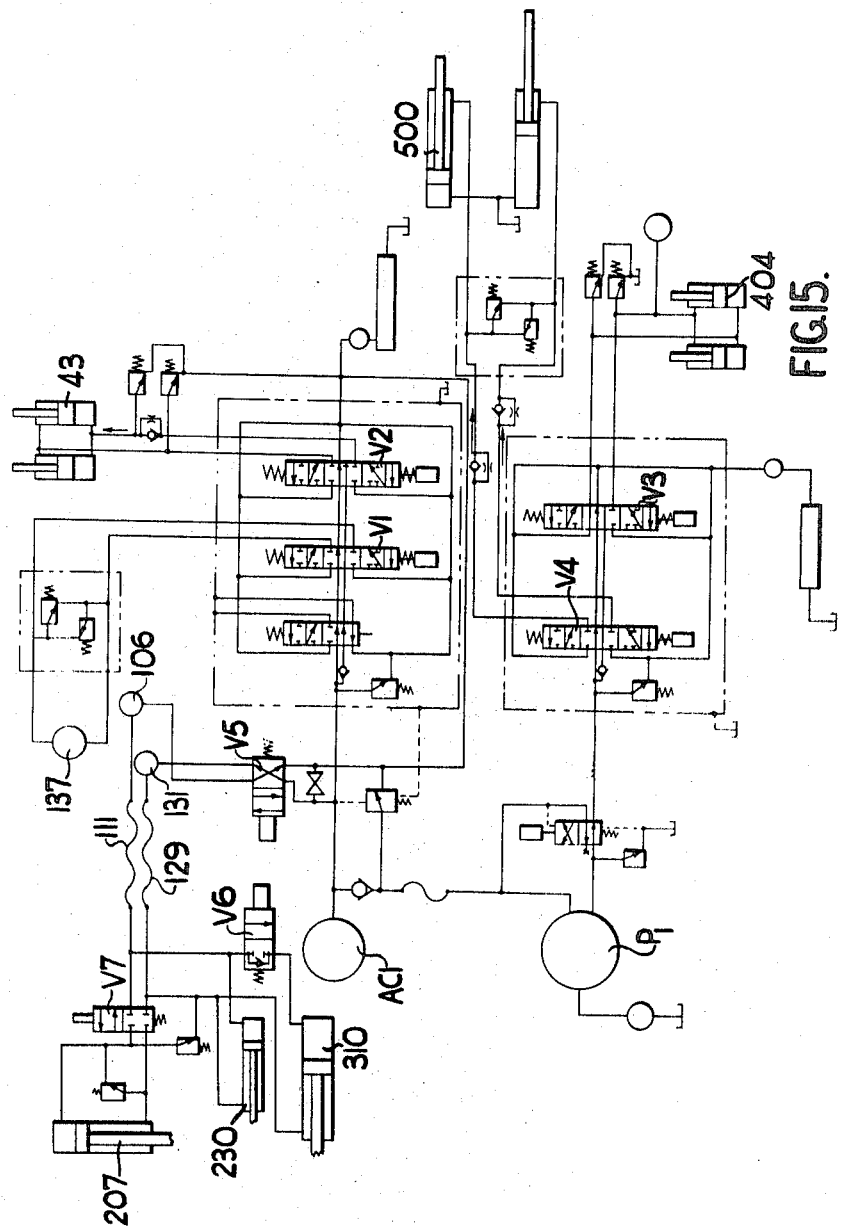

FELLING HEAD RECIPROCATING BLADE TYPE

This application is a continuation of application Ser. No. 639,883, filed May 19, 1967 and which is now abandoned.

The present invention relates to an improved shear, to the combination of a shear and grapple which will be referred to as a felling head, and to a self-propelled mobile vehicle for felling and skidding felled trees.

There are numerous types of shears for use in severing felled trees into selected lengths or severing standing trees as exemplified by U.S. Pat. Nos. 2,565,252 issued Aug. 21, 1951 to C. McFaull, 3,183,954 issued May 18, 1965 to R. W. Larson, and Canadian Pat. No. 728,975 issued Mar. 1, 1966 to Deere and Company.

The combination of a grapple and a shear or tree-severing means is also known as exemplified by U.S. Pat. Nos. 2,882,941 issued Apr. 21, 1959 to J. T. Pope and 3,140,736 issued July 14, 1964 to R. L. Propst.

Self- propelled vehicles for skidding trees by anchoring one end of the tree to a bunk on the vehicle are also known as exemplified by U.S. Pat. No. 3,227,295 issued Jan. 4, 1966.

Presently known shears may be of the reciprocating-blade type wherein the cutting edge of the knife travels in a straight line in a direction normal to the length of the tree. A single reciprocating blade of such type is illustrated in the aforementioned Canadian Pat. No. 728,975. In a reciprocating type of shear blade there is little or no tendency for the tree to escape from the jaw during the severing because of the straight line reciprocating motion of the knife. In other known types, the shear blades are pivotally mounted as exemplified by the aforementioned U.S. Pat. No. 3,183,954. The blades may be mounted on a common axis to provide a scissor type of arrangement or, alternatively, the pivot axes may be disposed in spaced relation. The aforementioned Larson U.S. Pat. No. 3,183,,954 is of the latter type and it is quite obvious there is some provision or means required to retain the log in the jaw during the severing operation. In a scissor type of arrangement, as exemplified by the aforementioned U.S. Pat. No. 2,565,252, there must also be provided some means of anchoring the vehicle relative to the tree during severing operations.

It is obvious that the reciprocating type of blade has certain characteristics as to force requirement for severing these characteristics varying in relation to depth of penetration of the blade into the log being severed. It is also further obvious that there are still further force characteristics relative to depth of penetration during severing which are peculiar to pivotally mounted jaws wherein there is a common pivot axis for the jaw members and a still further force characteristic for pivotally mounted blades having the pivot axis for the blades disposed in spaced relationship with respect to one another. In the latter two instances, the force requirement is dependent, among other things such as sharpness of material being severed etc., upon the outline shape of the cutting edge of the knife members. In most cases it will be found that the outline shape of pivotally mounted knife members is arcuate, while in a reciprocating-blade type, the cutting edge is a straight line.

It is an object of the present invention to provide a shear for severing trees wherein the motion of the blades is such as to combine the features of a pivotally mounted blade and a reciprocatingly mounted blade.

It is a still further object of the present invention to provide a shear which may be readily detachably secured adjacent a grapple whereby trees may be engaged or grasped by the grapple and simultaneously therewith or subsequently severed by the shear.

It is a still further object of the present invention to provide a felling head which includes the combination of a shear and grapple wherein the grapple is adapted to engage the tree at positions spaced longitudinally along the length of the tree whereby the tree may be manipulated in selected orientations by controlling movement of the grapple portion of the felling head.

It is a still further object of the present invention to provide a self-propelled mobile machine which may be driven into an area of trees to be felled and in sequence cut the trees and load one end of the cut trees onto a bunk on the vehicle without necessitating lowering such end of the tree to engage the ground prior to loading it onto the vehicle and further including means associated with the bunk for locking a plurality of trees on such bunk in horizontal spaced relation to provide effectively a platform to receive further felled trees on top thereof.

In accordance with one aspect of the present invention there is provided in the art of severing trees by a shear mechanism having a cutting member mounted on a frame, an abutment on said frame and means for moving said cutting member away from end toward said abutment respectively to embrace a tree therebetween and sever said tree, the improvement comprising moving the entire cutting member along a linear path and simultaneously pivoting said cutting member about an axis angularly disposed with respect to said path.

The various aspects of the present invention are illustrated by way of example with reference to the accompanying drawings wherein;

FIG. 1 is an oblique view of a mobile tree-felling skidding vehicle;

FIG. 2 is a side elevation of a grapple constructed in accordance with the present invention and illustrating a frame attached thereto for mounting thereon a pair of shear blades;

FIG. 5 is a cross-sectional view taken along section 5—5 of FIG. 3 illustrating a pivotal mount of one of the jaw members of the grapple;

FIG. 6 is a cross section along section 6—6 of FIG. 3 illustrating the pivotal connection of the hydraulic cylinder piston member onto one of the jaw members;

FIG. 7 is a top plan view of the shear assembly illustrated in FIG. 1 attached to the grapple; the combination of the shear and grapple comprising the felling head attached to the free end of the telescopic boom on the mobile machine, as illustrated in FIG. 1;

FIG. 8 is a stepped section taken substantially along 8—8 of FIG. 7;

FIG. 9 is a stepped cross-sectional view substantially along section 9—9 of FIG. 7;

FIG. 11 is a top plan view of FIG. 10;

FIG. 12 is a cross section taken along section 12—12 of FIG. 10;

FIG. 13 is a cross section along section 13—13 of FIG. 10;

FIG. 14 is a partial, sectional, vertical elevational view of an automatic bunk for pivotal mounting on the machine illustrated in FIG. 1; and FIG. 15 is a flow sheet of the hydraulic system for the vehicle.

Figure 3:
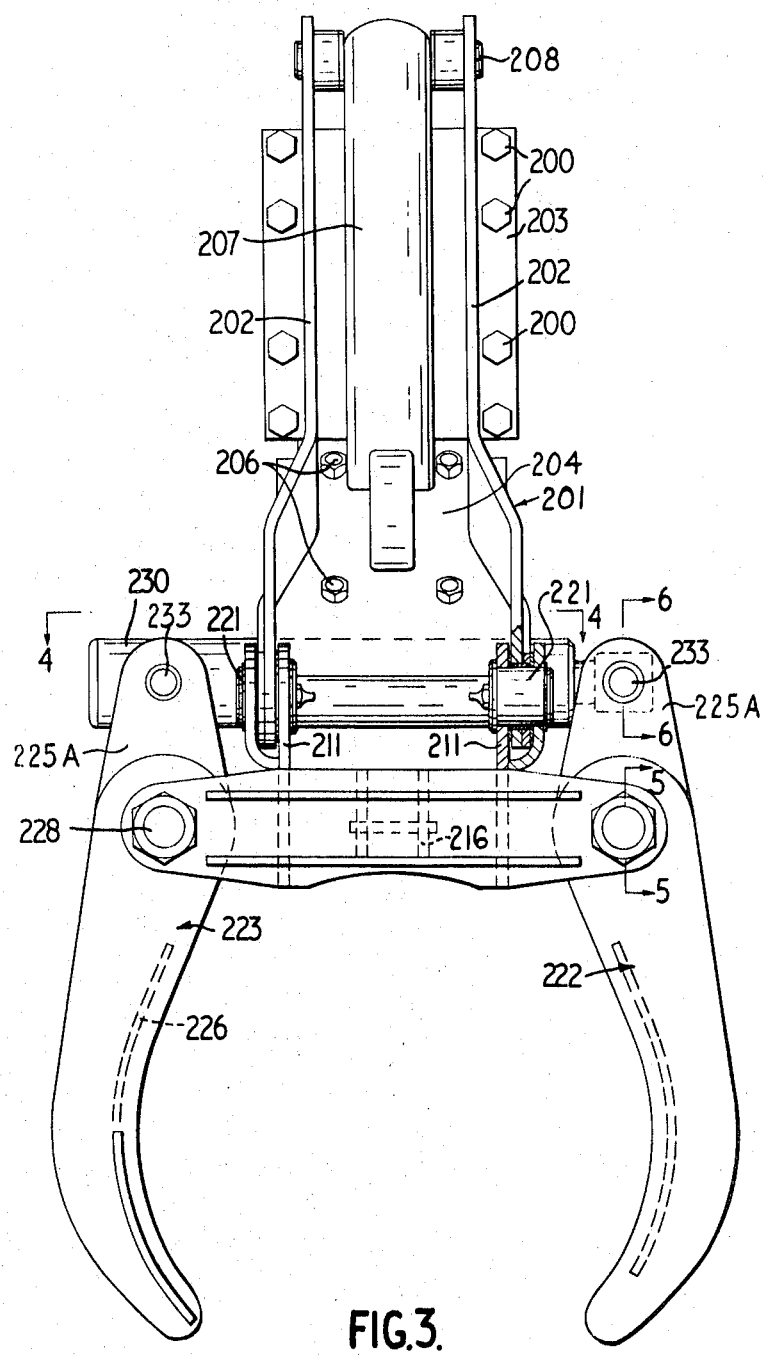
FIG. 3 is a front elevational view of the grapple illustrated in FIG. 2.

Referring now in detail to the drawings, shown therein is a self-propelled tree-felling and skidding machine 10. The machine consists of a crawler-type tractor unit 20 having a bunk 30 and an extendible and retractable boom 40, each pivotally mounted thereon. the boom illustrated is telescopic (this however need not be so) and fixed to the free end of the boom is a felling head assembly 50. The felling head consists of a grapple A and a shear assembly B rigidly, but detachably interconnected.

The crawler-type tractor portion 20 is the same as illustrated in the aforementioned U.S. Pat. No. 3,227,295 and consists of a pair of tracks 21 each driven by a sprocket member 22 connected to a power source 23 through a suitable drive mechanism. The power source 23 preferably consists of an internal combustion engine and the drive for the sprockets includes hydraulic pumps driven by the internal combustion engine and connected to hydraulic motors M, such motors being connected to the respective sprockets through suitable reduction transmission units 24. Control of the motors may be independent through appropriate valve mechanism in the fluid supply thus effecting control for steering. The hydraulic drive, with individual control for each track, permits driving each track forward or reverse independent of the other track and thus makes the vehicle extremely maneuverable. The hydraulic motors M are relatively high speed and reduction transmissions 24 provide a suitable speed range for the vehicle. This speed range could be in the vicinity of 0 to 8 or 10 m.p.h.

The tracks 21 consist of flexible members interconnecting rigid shoes which have guide horns forming a track for the support wheels 25. As seen in FIG. 1, there are four support wheels 25 and each wheel may be sprung independently of the others or dependent as may be desired.

The vehicle may be controlled by an operator positioned on a seat 26 secured to a platform on the vehicle adjacent one end thereof. Valves to control the hydraulic circuitry are located on a dashboard 27 and the fluid circuitry for the hydraulic system will be discussed in more detail hereinafter with reference to FIG. 15.

The boom assembly 40 is pivotally mounted on the vehicle by a pair of arms 41 rigidly secured at their upper end to the boom and pivoted at their lower end by a pin 42 on the vehicle platform. Pivotal movement of the boom 40, about the pivot pins 42, is effected by a pair of hydraulic cylinders 43 each pivotally connected at the cylinder end by a pin 44 to the platform and at their piston rod end, to the rearward end of the boom by a pin 45. Again, control of the boom, through the hydraulic cylinders 43, is provided by suitable valves located on the dashboard 27. Pivotal movement of the boom, about the pins 42, effects raising and lowering of the free end of the boom projecting rearwardly of the machine as viewed in FIG. 1. The boom 40 consists of a rigid outer boxlike member 46, having a cable and winch drum assembly 47 located at one end thereof, such end being adjacent the pivotal connection of the hydraulic cylinders 43 to the boom. The cable and winch drum assembly 47 located at one end thereof, such end being adjacent the pivotal connection of the hydraulic cylinders 43 to the boom. The cable and winch drum assembly will be described hereinafter in more detail with reference to FIGS. 10 to 13 inclusive.

The boom 40 further includes boxlike members 46A, 46B, and 46C telescopically mounted within the outermost rigid member 46. Extension of the boom members 46A, 46B, and 46C outwardly from the rigid member 46 is effected respectively by cables C1, C2, and C3. Retraction of the boom members 46A, 46B and 46C is effected by a cable wound on a drum in the assembly 47 and connected at the other end to the innermost boom member 46C. The extendible and retractable members of the telescopic boom illustrated may be guided by one or more rollers R or the like more fully disclosed in U.S. application Ser. No. 485,807. If desired, a knuckle-type boom may be substituted for the telescopic boom illustrated in FIG. 1.

The winch and cable assembly 47 is illustrated in FIGS. 10 to 13 inclusive. The front portion of the winch assembly is shown in detail in FIG. 13 and this portion of the winch assembly is the same as that used to effect operation of the grapple and extension and retraction of the boom illustrated in the aforementioned U.S. Pat. No. 3,227,295. The present equipment further includes the shear attached to the lower end of the grapple and thus, necessitating a further driven drum to receive a hydraulic hose and electrical conductor and such further drum is shown in detail in FIG. 12.

Referring to FIG. 13, the front portion of the winch assembly consists of a pair of drums 100 and 101 of different, but related diameters. The drum 101 is mounted by a shaft 102 extending through sidewall 103 which forms a portion of the casing for the winch assembly, the shaft being journaled on the sidewall 103 by a bearing 105. The shaft constitutes a portion of a reducer gearbox 140. Cantilevered from the free end of this shaft is a further shaft portion 102A connected, by a rotary hydraulic coupling 106, to a hydraulic feed supply line 107. The drum 101 includes a pair of lands 108 and 109, a cable 110 being wound on the land 108 and a hydraulic hose line 111 being wound on the land 109. The hydraulic line 111 is connected at one end to the shaft 102 by a hydraulic coupling 112 and at the opposite end by valves to a felling head tilt cylinder, a shear-actuating cylinder and a grapple-jaw-actuating cylinder to be described hereinafter.

The drum 100 is mounted on a shaft 113 journaled to the sidewalls of the casing by bearings 114 and 115. A sprocket 116 is secured to a hub 117 fixed by a setscrew 118 to rotate with the shaft 113. A similar toothed sprocket 119 is mounted on a hub 120 secured to the shaft 102. A further drum 121 (see FIG. 12) is disposed between the casing walls 103 and 104 and journaled to respective ones thereof by bearings 122 and 123. The drum 121 is mounted on a shaft 124 which is journaled to the casing by the bearings, and a drive sprocket 125 is secured to the shaft by a hub 126. The drum 121 is the same as the drum 101 illustrated in FIG. 13 and includes a pair of lands identified as 127 and 128. A hydraulic hose 129 is wound upon the land 127 and one end thereof is connected to the shaft 124 by a coupling 130. The hose is in communication with a bore in the shaft. A fluid pressure supply is connected to such bore by a rotatable coupling member 131.

An idler sprocket 132 (see FIGS. 10 and 11) is mounted on a shaft 133 journaled by bearings 134 and 135 respectively in the casing sidewalls 103 and 104. A link chain drive 136 entrains the idler 132 and the drum sprockets 119, 116, and 125.

The drums of the winch are driven by a hydraulic motor 137 secured to a bracket 138 projecting from the casing sidewall 103. The hydraulic motor 137 is connected by a drive coupling 139 to a transmission 140 which, likewise, is secured to the casing wall 103. The output shaft of the transmission 140 is connected to the drive shaft 102 having a sprocket 119 thereon meshing with the link chain 136. Alternatively, the output shaft may carry a gear meshing with a gear fixed to the shaft 113 or 124, or still further alternatively, the output shaft of the transmission may be connected to a shaft independent of the drum shafts and connected to drive the various drums by the use of a gear drive, pulleys and belts, or the like. The land 128, of the drum 121, has an insulated electrical conductor 141 wound thereon and the purpose of such conductor is to carry current to solenoid-operated valves located at the felling head.

The drum 100 has a cable C1 wound thereon with the free end of the cable attached to the end of the boom member 46A located within the fixed box boom member 46. Such cable effects extension of the boom while the cable 110, wound in the opposite direction on the drum 102, is connected to the inner end of the boom box section 46C, and effects retraction of the boom members. Suitable rotation of the drums during extension and retraction of the boom pays out and winds in the hydraulic conduits for supplying fluid to cylinders located at the felling head. The same action occurs with respect to the electrical cable 141. Cables C2 and C3 are secured respectively at one end to boom box members 46 and 46A and at the opposite ends respectively to boom box members 46B and 46C. A pulley is located intermediate the ends of each cable. The cable arrangement accordingly is such as to effect simultaneous telescopic movement of the movable boom sections 46A, 46B and 46C.

The felling head 50 is detachably secured, by a plurality of bolts 200, to the free end of the boom telescopic member 46C. The felling head 50 is secured to the boom by a bracket 201 consisting of a pair of spaced parallel plates 202 interconnected at one end by a plate 203 apertured to receive the bolts 200. The plates 202 are further interconnected by a plate 204 having a resilient shock pad 205 secured thereto by a plurality of bolt and nut assemblies 206. The opposite end of the plates 202 have an aperture extending therethrough to receive a pin 221 pivotally to mount the felling head on the bracket. A hydraulic tilt cylinder assembly 207 is pivotally connected at one end to the plates 202 by a pin 208 and at the opposite end to the grapple by a pin 209.

Figure 4:
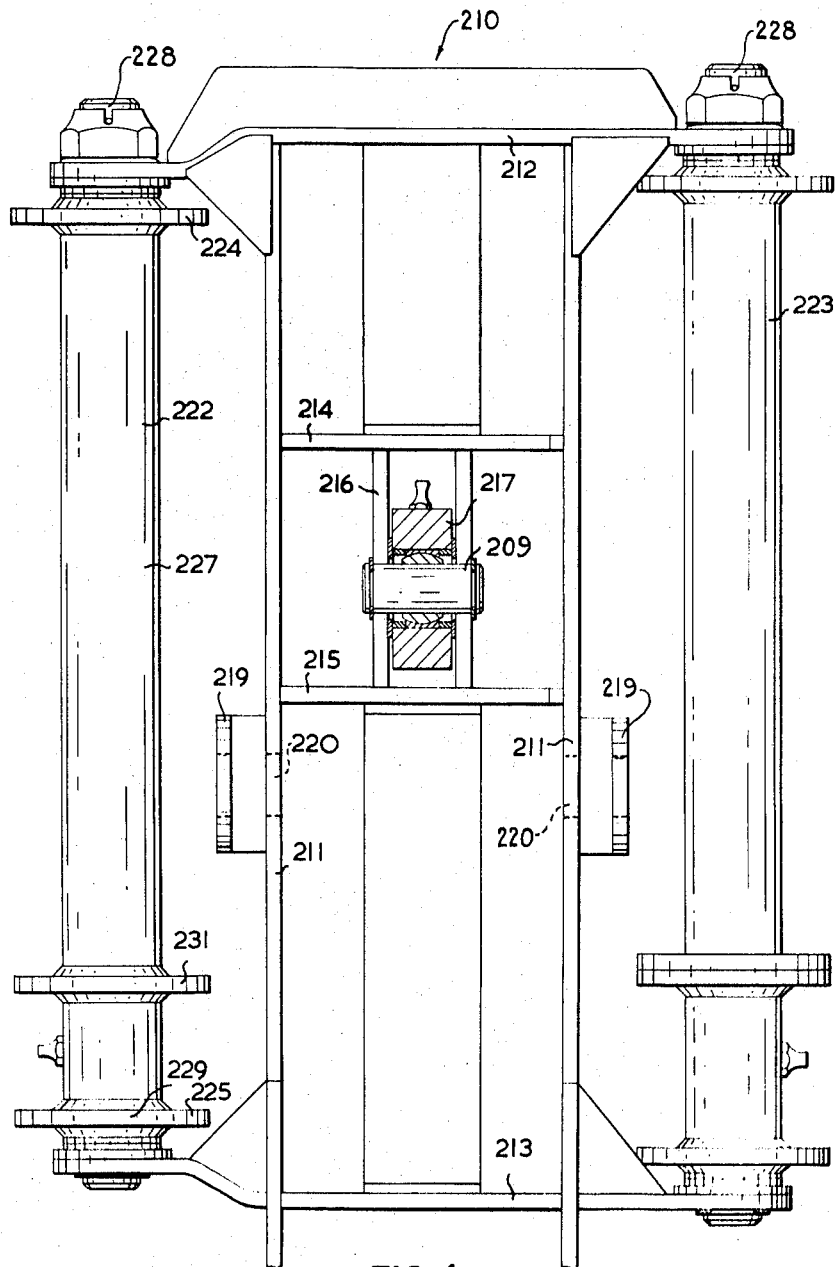
FIG. 4 is a rear elevational view, taken substantially along line 4—4 of FIG. 3, but excluding the bracket and pivotal mount of the grapple on the frame.
Figure 10:
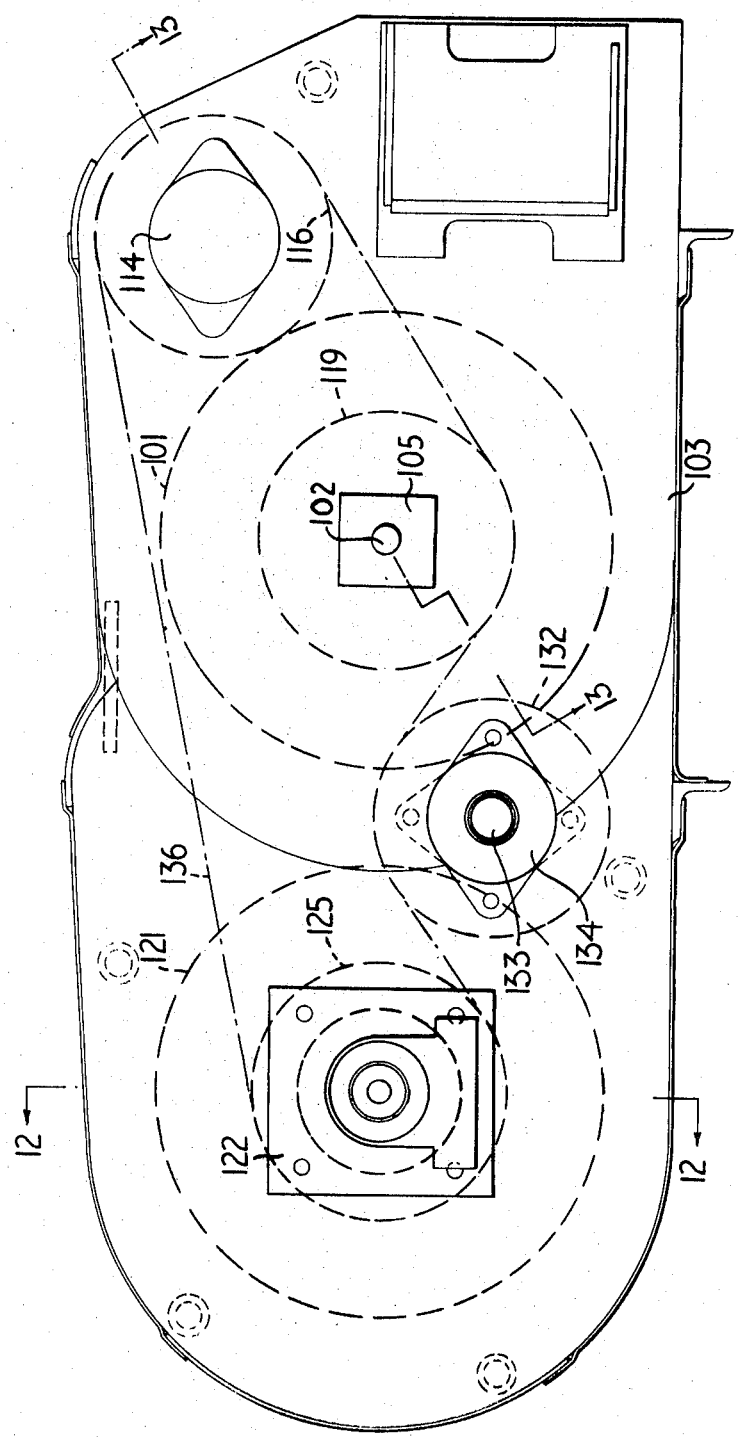
FIG. 10 is a side elevational view of the boom winch assembly for effecting operation of the telescopic movement of the boom sections and providing drum assemblies to carry hydraulic lines for independent operation of the grapple and shear.

The grapple A consists of a frame portion 210 which includes a pair of parallel spaced plates 211 interconnected at one end by a crossbar 212 and adjacent the opposite end by a further crossbar 213. Each of the crossbars 212 and 213 extend laterally beyond the plates 211 and are apertured adjacent the free ends thereof to receive a pin pivotally to mount the jaw members of the grapple. As will be seen from FIG. 4, the distance between the right-hand terminal ends of the bars 212 and 213 is greater than the distance between the terminal ends at the left-hand side. The purpose of this will become apparent when it is realized there is a pair of bars interconnected to form jaw members, the offset permitting overlapping of plate members forming the respective jaws in a jaw-closed position. The plates 211 are further interconnected intermediate the ends by crossbars 214 and 215 which, in turn, are interconnected by a pair of bars 216 spaced from one another to receive the piston rod end 217 of the hydraulic tilt cylinder 207. The rod end 217 of the cylinder is pivotally connected to the bars 216 by the pin 209.

The plates 211 each have an apertured lug 219 laterally offset therefrom, the apertures being in alignment with an aperture 220 located in each of the plates 211. A pin 221 passes through the aligned apertures in the lug and the adjacent plate 211 thereby pivotally mounting the grapple on the bracket 201.

The grapple includes a pair of jaws 222 and 223 each pivotally mounted on the crossbars or members 212 and 213. Each jaw includes an upper member 224 and a lower member 225 interconnected by an arcuately shaped plate 226. The members 224 and 225 are apertured and interconnected by a sleeve 227 to receive a pin 228 anchored at opposed ends respectively to the members 212 and 213 adjacent the free ends thereof. The member 225, on each jaw, has a portion 225A projecting rearwardly of the grapple frame and such projecting portion has an aperture to receive a pin 233 connecting a hydraulic cylinder 230 to respective ones of the jaws 222 and 223. An aperture plate 231 is secured to the sleeve 227 in spaced relation with respect to the extending portion 225A of the member 225 and the pin 233 used to connect the hydraulic cylinder to the grapple jaw, passes through the aperture in the plate.

The grapple-operating cylinder 230 is pivotally secured to the jaws 222 and 223 and hydraulic connections to such cylinder are clearly illustrated functionally in the schematic diagram shown in FIG. 15. It is obvious that opening and closing of the grapple by movement of the jaw members 222 and 223 is effected by appropriate direction of fluid into the cylinder of the grapple-operating cylinder 230.

The shear B is detachably secured to an end of the plates 211 which projects vertically below the crossmember 213 of the grapple frame. Such projecting end portion of each plate 211 is apertured to receive a plurality of bolt and nut assemblies 250. (See FIG. 2).

The shear B is illustrated in detail in FIGS. 7 and 8 and includes a rigid frame 300 secured to the grapple frame by the bolt and nut assemblies 250. The frame 300 comprises a pair of plates 301 and 302 disposed in spaced, parallel relationship and interconnected at one edge by a plate 303. Secured to the plate 303 and projecting therefrom is a pair of spaced lugs 304 apertured to receive the bolts of the bolt and nut assemblies 250 and thereby detachably secure the shear assembly to the lower end of the grapple frame. The members 304 project rearwardly from the frame 300 and are interconnected by a plate 305 forming an abutment to bear against the resilient shock pad 205 of the felling-head-mounting bracket.

A lever arm 306, consisting of a pair of members 307 is pivotally connected, intermediate the ends thereof, to the frame 300 by a pin 308 adjacent each end of the frame. The members 307 are located on the outside of the plates 301 and 302 and are each apertured adjacent opposite ends thereof. A pin 309 pivotally connects one end of a hydraulic cylinder assembly 310 to the lever 306 at one end of the frame and the other end of the hydraulic cylinder is similarly connected to the lever arm 306 at the other end of the frame. A knife holder 311 is pivotally secured to the opposite end of each lever arm 306 by a pin 312. The knife holder 311 has a portion thereof located between the lever arm members 307 and a further portion effectively located for sliding movement intermediate the plates 301 and 302. The plates 301 and 302 provide a guide channel and the cutting members slid in said channel during movement relative to one another. The portion of the cutting members, located intermediate the plates 301 and 302, each has a pin 313 projecting therethrough into an elongated slot 314 located in each of the plate members 301 and 302. The pins 313 are retained in assembled positions as for example by C-clips located on each pin respectively on the outside surface of plates 301 and 302. The pins in effect are sliding pivots movable along a path defined by the slots 314. The slot acts as a cam and the pin a cam follower. A knife or blade 315 is detachably secured to each holder 311 by a plurality of studs or bolt and nut assemblies 316. The knife or blades 315 are segmentally shaped with a straight cutting edge 315A located in face-to-face relation.

Fluid to the hydraulic cylinder 310 of the shear is supplied by the flexible conduits 111 and 129. Fluid from the supply lines is controlled, by suitable valve arrangements, to the conduit or couplings 320 and 321 connected to the hydraulic cylinder to effect appropriate action of the knife blades. Extension of the hydraulic cylinder unit causes closing of the shear blades to effect a severing or cutting operation and contractions of the unit causes opening of the blades.

The elongated slot 314 in the shear body is sloped so as to provide suitable pivotal movement of the shear blade simultaneously with the reciprocation of such blades. In a shear-closed position, the cutting edges 315A come into abutment where the edges are parallel to one another and as illustrated in FIG. 7, the cutting edges are inclined with respect to one another in an open position. Each cutting member by virtue of the pivotal connection to the frame by a lever arm 306 and a sliding pivot (313, 314) moves in a linear path and simultaneously pivots about an axis angularly disposed with respect thereto. The cutting edge accordingly moves through an arcuate path during movement of the cutting member relative to the frame and also the pair of cutting edges diverge outwardly from one another in a shear open position to provide a relatively wide space therebetween for receiving a tree to be severed. The slope of the slots 314, with respect to a centerline of the shear, may be such as to provide appropriate pivotal movement.

It is thus seen that the present shear provides blade movement combining the characteristics of reciprocating blades with that of the characteristics of pivotally mounted blades.

As previously mentioned, a bunk 30 is pivotally secured to the vehicle and it will be noted that the bunk illustrated in FIG. 14 differs from that illustrated in FIG. 1. The bunk in FIG. 14 consists of a substantially horizontally disposed rigid member 400 having an upstanding post 401 at each end thereof. A plurality of arcuately shaped jaw members 402 are pivotally mounted to the horizontal portion and disposed in such positions to provide means of anchoring logs 403 at a series of horizontally spaced positions along the length of the member 400. Anchoring of the several trees or logs on the bunk provides a first layer and thus, a platform to receive further logs or trees which do not require anchoring to be skidded or dragged by the vehicle to a further location. A bunk of this type permits a relatively low profile and in order to facilitate locking of the logs at the plurality of positions, the arcuately shaped members 402 are interconnected by hydraulic cylinders for interrelated movement. It will be noted from FIG. 14 adjacent jaw members 402 are interconnected by a hydraulic cylinder 404. The two outermost pivotally mounted anchoring levers 402 coact with the adjacent respective ones of the upstanding posts 401 to retain a log 403 therebetween. The two intermediate members 402 coact with one another to anchor logs therebetween. A first layer of trees to be skidded is anchored to the bunk, while subsequent layers can be piled thereupon to provide a complete load to be skidded to a selected site.

In the foregoing, there is described a grapple, a shear, the combination of a grapple and a shear which together provide a felling head for felling and handling a felled tree. The felling head mounted on a mobile vehicle, provides a unit for relatively rapid handling of trees, the handling including severing and felling standing trees and loading the felled trees onto the bunk. The trees are locked onto the bunk by hydraulically controlled, pivotally mounted levers and the entire load, thereafter, may be skidded to an appropriate site.

In operation of the vehicle, the operator drives the entire machine into an area of trees to be felled and then manipulates the boom 46 and felling head tilt cylinder 207 to place the grapple jaws embracingly around a vertically disposed tree with the shear adjacent the ground at a position to leave an appropriate length of stump. Preferably, the stumps are severed flush with the ground leaving the terrain smooth for further operation of the vehicle. The operator then, through suitable control valves, operates the hydraulic cylinder 230 to clampingly engage the tree with the grapple jaws and thereafter, further manipulation of valves effects operation of the shear cylinder 310 to bring the knife blades to a closed position and thereby sever the tree. The severed tree is balanced in a vertical position by the grapple and controllably lowered to a horizontal position through control of the grapple tilt cylinder 207.

Raising and lowering of the felling head is effected by control of fluid to the boom tilt cylinders 43 and through control of these cylinders and by suitable rotation of the deck R, the tree may be placed on the bunk. The felled trees loaded on the bunk are locked onto the bunk by control of fluid to the hydraulic cylinders 404 and the load of trees may then be skidded where desired.

The operator's station, along with the dashboard and control valves are preferably pivotally mounted on the vehicle frame so as to permit slewing about a vertical axis. In this way, the boom may be turned to facilitate picking up and/or felling trees located not only behind the vehicle but to either side thereof. The rotary deck, which is generally indicated in FIG. 1 by the reference numeral R, is mounted upon a shear ball mechanism with slewing motion provided by a cable and drum assembly. The cable may be wound around the outer race of the shear ball mechanism and operated by a pair of hydraulic cylinders to effect slewing motion. In an alternative embodiment (not illustrated) a cab may be provided which is fixed rigidly to the vehicle with a rigid upper framework to support the bearing mechanism. In such case, one portion of the bearing is mounted on the cab and the other cooperating part of the bearing is fixed to the boom mechanism 46; i.e. the rigid outer box member. Obviously, in such arrangement, the hydraulic boom tilt cylinder will have to be located so as to rotate with the boom mechanism 46 as it pivots about a vertical axis. The exact arrangement for slewing is immaterial but as will be seen in FIG. 15, control of the same is effected by hydraulic cylinders 500.

The hydraulic circuitry for the skidder vehicle is illustrated in FIG. 15 wherein it will be seen that the various hydraulic cylinders are individually controlled by valves in a pressure-fluid system provided by a pump P1. The pump, through suitable conduits, supplies fluid to a valve V1 which controls extension and retraction of the telescopic boom through the boom winch motor 137. Fluid is further supplied to a valve V2 which controls movement of the boom-lifting cylinders 43. A further pair of valves V3 and V4 are provided in the circuit which controls respectively the bunk cylinders 404 and hydraulic cylinders 500 controlling the slewing movement of the vehicle. Fluid is further supplied through a valve V5 to a pair of valves V6 and V7 controlling the boom tilt cylinder 207 and the grapple jaw cylinder 230 and the shear-actuating cylinder 310. The arrangement of the valves is such that the shear cylinder can be actuated only after the grapple jaws are biased to a closed position by the cylinder 230. The remainder of the hydraulic circuitry illustrated includes an accumulator AC1 and various relief and check valves common to pressurized-fluid systems where hydraulic elements are controlled by various valves and combinations of valves.

In the foregoing description, the cutting members are described as consisting of cutting blades 315 having a cutting edge 315A. The cutting blades are preferably platelike members and where a pair of such blades are utilized; preferably, they are both movable and disposed in a common plane. Alternatively, however, one of the blades may be fixed to the frame. Also, alternatively, one blade may be replaced by an abutment member either fixed or movable. Also, when using a pair of cutting blades, they may be offset from one another to provide, in effect, a scissor action. This, however, is undesirable from a force and stress point of view, particularly when cutting relatively large trees.

I claim:
1. A felling head comprising in combination:
   a. a grapple having:
      i. a frame,
      ii. a pair of jaw members at least one of which is pivotally mounted on said frame for movement toward and away from the other and together providing a grapple jaw which may be selectively opened and closed relative to a selected plane passing between said jaw members, and
      iii. first power means connected to said movable grapple jaw member selectively to open and close said grapple jaw;
   b. a shear rigidly secured to said frame in fixed spaced relation, relative to said grapple jaw along said plane, said shear including
      i. a pair of cutting members mounted on said frame for movement relative thereto, each of said cutting members comprising a shear blade having a cutting edge movable in a direction toward and away from said selected plane respectively severing an article grasped by the grapple and receiving an elongated article to be severed, and
      ii. second power means controllably moving said cutting members relative to one another and said frame in a direction toward and away from said selected plane; and
   c. pivot means on said frame, adjacent said grapple and shear jaws, for pivotally mounting said felling head directly on an extendible and retractable boom or the like.

2. A felling head as defined in claim 1 wherein each of said grapple jaw members is pivotally mounted on said frame and movable about respective ones of a pair of axes substantially parallel to one another and said selected plane.

3. A felling head as defined in claim 1 wherein the pivot axes in each pair of jaw members are offset with respect to one another respectively on opposite sides of said plane.

4. A felling head as defined in claim 1 including link and pivot means interconnecting said shear blades and frame pivotally and reciprocally mounting the shear blades on said frame.

5. A felling head as defined in claim 3 including link and pivot means interconnecting said shear blades and frame pivotally and reciprocally mounting the shear blades on said frame.

6. A felling head comprising in combination;
   a. a grapple having:
      i. a frame,
      ii. a pair of jaw members at least one of which is pivotally mounted on said frame for movement toward and away from the other and together providing a grapple jaw which may be selectively opened and closed relative to a selected plane passing between said jaw members, and iii. first power means connected to said movable grapple jaw member selectively to open and close said grapple jaw;

b. a shear rigidly secured to said frame in fixed spaced relation, relative to said grapple jaw along said plane, said shear including:

i. a pair of cutting members each mounted on said frame for movement relative thereto by a pair of pivots, one of which is slidable relative to the frame whereby each cutting member moves along a linear path and simultaneously pivots about an axis angularly disposed with respect to said path, each of said cutting members comprising a shear blade having a cutting edge movable in a direction toward and away from said selected plane respectively severing an article grasped by the grapple and receiving an elongated article to be severed; and ii. second power means controllably moving said cutting members relative to one another and said frame in a direction toward and away from said selected plane; and c. pivot means on said frame, adjacent said grapple and shear jaws, for pivotally mounting said felling head directly on an extendible and retractable boom or the like.

7. A felling head comprising in combination:
a. a grapple having;
i. a frame,
ii. a pair of jaw members at least one of which is pivotally mounted on said frame for movement toward and away from the other and together providing a grapple jaw which may be selectively opened and closed relative to a selected plane passing between said jaw members, and
iii. first power means connected to said movable grapple jaw member selectively to open and close said grapple jaw;

b. a shear rigidly secured to said frame in fixed spaced relation, relative to said grapple jaw along said plane, said shear including;

i. a pair of cutting members each mounted on said frame for movement relative thereto by a lever pivotally connected at spaced positions respectively to the cutting member associated therewith and the frame and one further pivotal connection between the cutting member and the frame, said levers being located one on each of opposite sides of said plane with their pivot axes disposed substantially parallel thereto and said further pivotal connection between the respective cutting members and the frame being located between the pivotal connections of the levers to said frame, each of said cutting members comprising a shear blade having a cutting edge movable in a direction toward and away from said selected plane respectively severing an article grasped by the grapple and receiving an elongated article to be severed, and ii. second power means controllably moving said cutting members relative to one another and said frame in a direction toward and away from said selected plane; and c. pivot means on said frame, adjacent said grapple and shear jaws, for pivotally mounting said felling head directly on an extendible and retractable boom or the like.

8. A felling head as defined in claim 7 wherein said further pivotal connections are located one on each of opposite sides of said selected plane.

9. A felling head as defined in claim 7 wherein said second power means comprises a hydraulic piston-cylinder assembly interconnecting said pair of levers.

10. A felling head comprising in combination:
a. a grapple having;
i. a frame,
ii. a pair of jaw members at least one of which is pivotally mounted on said frame for movement toward and away from the other and together providing a grapple jaw which may be selectively opened and closed relative to a selected plane passing between said jaw members, and
iii. first power means connected to said movable grapple jaw member selectively to open and close said grapple jaw;

b. a shear rigidly secured to said frame in fixed spaced relation, relative to said grapple jaw along said plane, said shear including;

i. a pair of cutting members each mounted on said frame for movement relative thereto by a lever pivotally connected at a pair of spaced positions respectively to the shear frame and shear blade associated therewith and a further pivotal connection, said levers being located one on each of opposite sides of said selected plane and having the pivotal connection of the levers to said frame located respectively adjacent opposed ends of the frame and said further pivotal connections being located therebetween, each of said cutting members comprising a shear blade having a cutting edge movable in a direction toward and away from said selected plane respectively severing an article grasped by the grapple and receiving an elongated article to be severed, and ii. second power means controllably moving said cutting members relative to one another and said frame in a direction toward and away from said selected plane; and c. pivot means on said frame, adjacent said grapple and shear jaws, for pivotally mounting said felling head directly on an extendible and retractable boom or the like.

11. A felling head as defined in claim 7 wherein each lever includes a portion projecting from said shear frame in a direction opposite to that of the shear blades.

12. A felling head as defined in claim 11 wherein said second power means comprises a hydraulic piston-cylinder assembly interconnecting said projecting portion of said levers thereby locating the shear blades and hydraulic cylinder respectively on opposite sides of the frame.

13. A felling head as defined in claim 7 wherein the cutting edges of said shear blades are movable in a common plane.

14. A felling head as defined in claim 11 wherein each said shear blade is a substantially flat platelike member having a cutting edge and wherein the cutting edge of said flat plate members is movable toward and away from one another in a common plane.

15. A felling head as defined in claim 7 wherein said shear blades each having a longitudinally extending cutting edge and wherein said cutting edges are located substantially in abutting face-to-face relation in a shear jaw-closed position.

16. A felling head as defined in claim 7 wherein said further pivot is a sliding pivot confined to a path angularly disposed with respect to the direction of reciprocal movement of the shear blades.

17. A felling head comprising in combination;
a. a grapple having:
i. a frame,
ii. a pair of jaw members at least one of which is pivotally mounted on said frame for movement toward and away from the other and together providing a grapple jaw which may be selectively opened and closed relative to a selected plane passing between said jaw members, and
iii. first power means connected to said movable grapple jaw member selectively to open and close said grapple jaw;

b. a shear rigidly secured to said frame in fixed spaced relation, relative to said grapple jaw along said plane, said shear including:

i. a pair of cutting members each mounted on said frame for movement relative thereto by a lever pivotally connected to the shear blade associated therewith and the frame at respective first and second positions and a further pivot connection together causing each cutting member to move along a linear path and simultaneously pivot about an axis angularly disposed with respect to said path during movement of such cutting members in a direction toward and away from one another, each said further pivot connection comprising a sliding pivot confined to a path angularly disposed with respect to the direction of reciprocal movement of the shear blades and including an elongated slot in the frame and a portion of the cutting member projecting into said slot for sliding therealong, each of said cutting members comprising a shear blade having a cutting edge movable in a direction toward and away from said selected plane respectively severing an article grasped by the grapple and receiving an elongated article to be severed, and ii. second power means controllably moving said cutting members relative to one another and said frame in a direction toward and away from said selected plane; and c. pivot means on said frame, adjacent said grapple and shear jaws, for pivotally mounting said felling head directly on an extendible and retractable boom or the like.

18. A felling head as defined in claim 17 wherein said path and pivotal connection of the lever to the frame and cutting member are so related as to effect arcuate movement of the cutting edge of each respective cutting member during movement thereof.

19. A felling head as defined in claim 7 including a guide channel in the frame and wherein each of said shear blades has a portion thereof slidably mounted in said guide channel.

20. A felling head as defined in claim 7 including a separate shear and grapple frame, said shear comprising a pair of flat, substantially parallel plates disposed in selected spaced relationship and providing a guide channel for said shear blades, each of said shear blades having a portion disposed between said plates and means securing said shear frame to said grapple frame.

21. A felling head as defined in claim 1 characterized in that said grapple jaw extends longitudinally along said plane from a position in close proximity to said shear to a position remote therefrom and thereby permits grasping a longitudinal length of tree to facilitate handling the same.

22. A felling head as defined in claim 1 wherein the pivot means on said frame for pivotally connecting said felling head directly to an extendible and retractable boom has the pivot axis thereof substantially perpendicular to said selected plane.

23. A felling head as defined in claim 22 characterized in that the pivot axis of the mounting of the felling head and the pivot axes of the grapple jaw members are substantially perpendicular to one another.

24. A felling head comprising in combination:
a. a grapple having:
i. a frame,
ii. a pair of jaw members at least one of which is pivotally mounted on said frame for movement toward and away from the other and together providing a grapple jaw which may be selectively opened and closed relative to a selected plane passing between said jaw members, and
iii. first power means connected to said moveable grapple jaw member selectively to open and close said grapple jaw;
b. a shear rigidly secured to said frame in fixed spaced relation, relative to said grapple jaw along said plane, said shear including:
i. a channel in a selected portion of said frame, a pair of cutting members mounted on said frame for movement relative thereto, each of said cutting members comprising a shear blade having a cutting edge movable in a direction toward and away from said selected plane respectively severing an article grasped by the grapple and receiving an elongated article to be severed, a portion of each of said cutting members being slidable in said channel with the cutting edge of one cutting member facing the cutting edge of the other, said cutting members being connected to said shear frame by respective ones of a pair of levers, one lever being pivotally connected to the frame adjacent one end of said channel and the other lever pivotally connected to the frame adjacent the opposite end of said channel, means pivotally connecting said levers to respective ones of the shear blades, said shear blades further being connected to the shear frame by a sliding pivot comprising a cam and a cam follower respectively associated with one or the other of said frame and cutting members, and ii. second power means controllably moving said cutting members relative to one another and said frame in a direction toward and away from said selected plane; and c. pivot means on said frame, adjacent said grapple and shear jaws, for pivotally mounting said felling head directly on an extendible and retractable boom or the like.

25. A felling head comprising in combination a grapple and a shear rigidly secured to a common frame in fixed spaced relation relative to one another, said grapple including a jaw defined by a pair of members pivotally mounted on said frame for movement about respective ones of a pair of axes disposed in spaced relation with respect to one another, said members being movable by pivoting about their respective pivots in a direction toward and away from a plane located therebetween and substantially parallel to such pivot axes and said shear also including a jaw similarly oriented with respect to said frame, said shear jaw being defined by a frame and a pair of shear blades pivotally connected to said frame at respective positions located on opposite sides of said plane and each having a cutting edge movable in a direction toward and away from said plane respectively to sever and receive an elongated article, first power means connected to said grapple jaw members selectively opening and closing said grapple jaw and second power means selectively opening and closing said shear jaw.

26. A felling head comprising in combination:
a. a grapple having a frame, a pair of members each pivotally mounted on said frame, and together providing a grapple jaw which may be selectively opened and closed relative to a selected plane passing between said members, and first power means interconnecting said pair of members to pivot the same about their respective pivotal connections to the frame selectively opening and closing said grapple jaw; and
b. a shear rigidly secured to said frame in fixed spaced relation, relative to said grapple, along said plane, said shear including a frame, a pair of cutting members, means mounting said cutting members on said shear frame comprising a pair of lever arms each pivotally connected to said frame and a selected portion of respective ones of said pair of cutting members, the pivotal connection of said lever arms to said frame being disposed in selected spaced relationship with respect to one another on opposite sides of said plane, and a further pivotal connection between respective ones of said pair of cutting members and said frame, each of said cutting members comprising a shear blade having a substantially straight cutting edge which, in a shear jaw-closed position, are substantially parallel to one another in face-to-face abutting relation and, in a shear jaw-open position, converge inwardly toward one another in a direction toward the frame and thereby provide a widemouthed jaw in the latter position for receiving an article to be severed, said cutting members being movable in a direction toward and away from said selected plane for respectively severing an article grasped by the grapple and receiving an elongated article to be severed, and second power means for moving said cutting members relative to said selected plane.

27. A felling head as defined in claim 26 wherein said grapple jaw extends longitudinally along said plane from a position in close proximity to said shear to a position remote thereof and thereby permits grasping a longitudinal length of tree to facilitate handling the same.

28. A felling head comprising in combination:
a. a grapple having a frame, a pair of members each pivotally mounted on said frame, and together providing a grapple jaw which may be selectively opened and closed relative to a selected plane passing between said members, and first power means interconnecting said pair of members to pivot the same about their respective pivotal connections to the frame selectively opening and closing said grapple jaw; and
b. a shear rigidly secured to said frame in fixed spaced relation, relative to said grapple, along said plane, said shear including a frame, a pair of cutting members, means mounting said cutting members on said shear frame comprising a pair of lever arms each pivotally connected to said frame and a selected portion of respective ones of said pair of cutting members, the pivotal connection of said lever arms to said frame being disposed in selected spaced relationship with respect to one another, and located one on each of opposite sides of said plane with their respective pivot axes substantially parallel thereto, and a further pivotal connection between respective ones of said pair of cutting members and said frame, said further pivot connection being located between the pivotal connections of the levers to said frame, each of said cutting members comprising a shear blade having a substantially straight cutting edge which, in a shear jaw-closed position, are substantially parallel to one another in face-to-face abutting relation and, in a shear jaw-open position, converge inwardly toward one another in a direction toward the frame and thereby provide a widemouthed jaw in the latter position for receiving an article to be severed, said cutting members being movable in a direction toward and away from said selected plane for respectively severing an article grasped by the grapple and receiving an elongated article to be severed, and second power means for moving said cutting members relative to said selected plane.

29. A felling head as defined in claim 26 including pivot means on said frame having a pivot axis substantially perpendicular to said selected plane for pivotally mounting the same directly to an extendible and retractable boom and located adjacent in said grapple and shear jaws.

30. A felling head as defined in claim 26 including pivot means on said frame having a pivot axis substantially perpendicular to said selected plane for pivotally mounting the same directly to an extendible and retractable boom, said pivot means being located adjacent said grapple and shear jaws, and wherein said levers are located one on each of opposite sides of said selected plane and have their pivot axes substantially parallel thereto.

31. A felling head as defined in claim 26 wherein said grapple jaw members are pivoted about respective ones of a pair of axes disposed one on each of opposite sides of said selected plane and wherein said levers are similarly located one on each of opposite sides of said plane.

32. A shear comprising in combination:
a. an elongated frame;
b. two shear blades movable in a direction toward and away from one another respectively to sever and receive an article therebetween, said shear blades having at least a portion projecting outwardly away from the frame;
c. two link means, means pivotally connecting said link means to said frame at respective first and second positions disposed in selected spaced relationship with respect to one another longitudinally along the frame, means connecting said link means to the respective shear blades at a position spaced from the pivotal connection of the same link to the frame; and
d. further means providing interengagement of said cutting members and said frame at respective third and fourth positions spaced apart longitudinally along the frame and disposed between said first and second positions.

33. A shear comprising in combination:
a. an elongated frame;
b. two shear blades movable in a direction toward and away from one another respectively to sever and receive an article therebetween, said shear blades having at least a portion projecting outwardly away from the frame;
c. two link means, means pivotally connecting said link means to said frame at respective first and second positions disposed in selected spaced relationship with respect to one another longitudinally along the frame, means connecting said link means to the respective shear blades at a position spaced from the pivotal connection of the same link to the frame;
d. further means providing interengagement of said cutting members and said frame at respective third and fourth positions disposed between said first and second positions, and
e. power means interconnecting said link means for effecting movement of the same controllably to move the shear blades respectively toward and away from one another for severing and receiving an article therebetween.

34. A shear as defined in claim 33 characterized in that each of said two link means includes a portion projecting from said frame in a direction opposite to that of the shear blades and that said power means comprises a hydraulic piston-cylinder assembly connected to the said projecting portion of said link means thereby locating the shear blades and hydraulic piston-cylinder assembly respectively on opposite sides of said frame.

35. A shear as defined in claim 33 characterized in that said link means comprises a pair of lever arms pivotally connected to said frame respectively adjacent opposed ends thereof.

36. A shear as defined in claim 33 characterized in that each shear blade has a substantially straight, longitudinally extending cutting edge.

37. A shear as defined in claim 36 characterized in that each of said shear blades consists of a substantially flat platelike member having a cutting edge and wherein said plate members are disposed in a common plane.

38. A shear for severing trees or the like comprising in combination:
a. a frame;
b. two shear blades attached to the frame in spaced relation relative to one another and having cutting edges substantially in alignment longitudinally along a major portion of their length in a shear jaw-closed position;
c. link means pivotally connected at spaced positions to the frame and respective shear blades connecting the respective shear blades to the frame; and
d. cam means for guiding said shear blades during movement thereof relative to the frame.

39. A shearing device composed of:
a. a main transverse frame structure with opposite transversely spaced ends;
b. a pair of levers supported one adjacent each of the respective opposite ends of the frame structure to swing about spaced-apart, substantially parallel axes;
c. a pair of blades forwardly of the frame structure and having opposed inner cutting edges in face-to-face relation;
d. pivot means supporting the respective blades on the respective levers;
e. cam means on the frame structure, engageable with the respective blades, adapted to angularly adjust the blades on their respective pivot means in response to their being moved relative to one another and the frame by the respective levers; and f. hydraulic motor means for pivoting the levers about their respective pivotal connections to the frame to effect movement of the cutting members.

40. A shearing device composed of:
a. a main frame structure with opposite transversely spaced ends;
b. a pair of levers supported one adjacent each of opposite ends of said frame structure to swing about respective ones of a pair of axes spaced from one another, each of the levers having a portion projecting from said frame structure.
c. a pair of blades pivotally connected to respective ones of the levers and having cutting edges in face-to-face relation;
d. guide means on the frame structure engageable with the respective blades adapted to angularly adjust the blades about their respective pivotal connections to the levers during movement thereof relative to the frame in response to their being shifted by the respective lever; and
e. hydraulic motor means for moving the levers about their respective pivotal connections to the frame structure.

41. The structure as set forth in claim 40 in which the guide means are cams engaging the respective blades.

42. The structure as set forth in claim 41 in which the cams are so positioned and shaped that as the levers shift the blades outwardly in respect to one another, the blade cutting edges will diverge in respect to one another in a direction away from the frame.

43. The structure as set forth in claim 42 in which the blades are coplanar and the cutting edges will be forced by the cams to substantial abutment upon the levers shifting them to their innermost positions.

44. The structure as set forth in claim 40 in which the hydraulic motor means is an extendible and retractable hydraulic cylinder and ram device with the hydraulic cylinder being connected to one lever and the ram being connected to the other end.

45. The structure as set forth in claim 40 in which the levers are three-point levers, the hydraulic motor means is an extendible and retractable ram and cylinder, the levers swing about points intermediate their ends on the respective ends of the structure, means are on the forward ends of the levers pivotally connecting the same to the respective cutting members, and the rear ends of the levers are connected to the ram and cylinder respectively.

46. The structure as set forth in claim 40 in which each blade is one-half of a circular plate with each of the respective cutting edges being along the diameter.

47. A shear comprising in combination:
a. an elongated frame;
b. two shear blades movable in a direction toward and away from one another respectively to sever and receive an article therebetween, said shear blade having at least a portion projecting outwardly away from the frame and movable relative thereto for receiving and severing said article;
c. two link means, means pivotally connecting said link means to said frame at respective first and second positions disposed in selected spaced relationship with respect to one another longitudinally along the frame, means connecting said link means to the respective shear blades at a position spaced relative to the pivotal connections of the same linked to the frame; and
d. further means pivotally connecting said cutting members to said frame at respective third and fourth positions spaced apart longitudinally along the frame and disposed between said first and second positions.

48. A shear mechanism comprising a frame having a guide channel in a portion thereof, at least one cutting member having a portion thereof located in said channel, and mounted on said frame, means for effecting movement of the cutting member, relative to the frame in a direction toward and away from an abutment on said frame, said cutting member having a cutting edge angularly disposed with respect to the direction of movement thereof and means mounting said cutting member on said frame comprising a first lever arm pivotally connected at a pair of spaced positions respectively to said cutting member and said frame, and a second pivotal connection, between said cutting member and said frame, disposed in said channel in spaced relation with respect to the lever arm, said second pivotal connection being movable, with respect to the frame, along a given path and guide means restricting movement of the same to said given path.

49. The improvement as defined in claim 48 wherein said given path is angularly disposed with respect to the direction of reciprocal movement of said cutting member, said angularly related path and first pivot being so related as to provide arcuate movement of the cutting edge of the cutting member during movement thereof.

50. A shear mechanism as defined in claim 48 wherein said frame comprises a pair of flat, substantially parallel plates disposed in selected spaced relationship and wherein said cutting member includes a portion disposed between said plates, the latter providing a further guide for the cutting member during movement thereof.

51. A shear mechanism comprising in combination: a frame: a pair of cutting members; and means mounting said cutting members on said frame comprising a pair of lever arms each pivotally connected to said frame and a selected portion of respective ones of said pair of cutting members, the pivotal connection of said lever arms to said frame being disposed in selected spaced relationship with respect to one another, and a further pivotal connection between respective ones of said pair of cutting members and said frame, said further pivotal connections and lever arm pivots being so arranged that the cutting members each move in an arcuate path in a direction toward and away from one another, said cutting members each having a substantially straight cutting edge which, in a shear jaw-closed position, are substantially parallel to one another in face-to-face relation and, in a shear jaw-open position, converge inwardly toward one another in a direction toward the frame and thereby provide a widemouthed jaw in the latter position for receiving an article to be severed.

52. The improvement as defined in claim 51 including a guide channel in said frame and wherein each of said cutting members has a portion thereof slidably mounted in said guide channel.

53. A shear for severing trees as defined in claim 52 wherein said channel is located in one side of the frame and extends along a selected portion of the length thereof.

54. A shear mechanism as defined in claim 53 wherein said frame comprises a pair of flat, substantially parallel plates disposed in selected spaced relationship and thereby providing said guide channel and wherein said cutting members each include a portion disposed between said plates, the latter providing a guide for the cutting members during movement thereof relative to said frame.

55. A shear as defined in claim 51 wherein said further pivotal connections comprise an elongated slot in said frame and a portion, associated with respective ones of the cutting members, projecting into the slot.

56. A shear as defined in claim 51 including power means for effecting movement of said shear blades.

57. A shear as defined in claim 56 wherein said power means includes a hydraulic piston-cylinder assembly.

58. A shear as defined in claim 57 wherein said hydraulic piston-cylinder assembly is connected to said lever arms.

59. A shear as defined in claim 58 wherein said hydraulic piston-cylinder assembly interconnects the pair of lever arms.

60. A shear as defined in claim 59 wherein each lever arm includes a portion projecting from said frame in a direction opposite to that of the shear blades.

61. A shear as defined in claim 60 wherein the hydraulic piston-cylinder assembly is connected to the said projecting portion of said pair of lever arms thereby locating the shear blades and hydraulic cylinder respectively on opposite sides of the frame.

62. A shear as defined in claim 51 wherein each of said lever arms comprises a pair of rigid members located respectively one on each of opposite sides of the frame and the correspondingly oriented opposite sides of the shear blade associated therewith.

63. A shear as defined in claim 51 wherein each of said cutting members consists of a substantially flat platelike member having a cutting edge and wherein said plate members are disposed in a common plane.

64. A shear as defined in claim 51, wherein said frame has a channel in one side thereof and each of said cutting members has a portion slidable in said channel with the cutting edge of one member facing the cutting edge of the other member, said lever arms being pivotally connected to the frame adjacent opposed ends of said channel and wherein said other pivotal connections comprise sliding pivots each including a cam and a cam follower respectively associated with one of said frame and cutting member and the other of said frame and cutting member.

65. A shear as defined in claim 64 including power means connected to said pair of lever arms to pivot the same about their respective pivotal connections to the frame for moving the cutting members in a direction toward and away from one another.

66. A shear for use in severing trees comprising in combination:
 a. a rigid frame having an elongated channel therein;
 b. a pair of cutting members each having a portion thereof slidable in said channel and further including a cutting edge;
 c. a first pair of pivot means connecting respective ones of said pair of cutting members to said frame at a first pair of positions disposed in selected spaced relation relative to one another;
 d. a second pair of pivot means connecting respective ones of said pair of cutting members to said frame, said second pivot means of one cutting member being disposed in spaced relationship with respect to said first pivot means associated with said cutting member and movable relative thereto along a selected path;
 e. means guiding said second pivots along their respective selected paths; and
 f. means for moving said cutting members, relative to the frame, in a direction toward and away from one another, including a pair of lever arms pivotally connected to said frame and to respective ones of said cutting members and means to move said lever arms.

67. A shear as defined in claim 66 wherein said means for moving said lever arms includes a hydraulic piston-cylinder assembly interconnecting said pair of lever arms.

68. A shear mechanism comprising in combination:
 a. a frame;
 b. a pair of lever arms each pivotally connected to said frame in selected spaced relationship with respect to one another;
 c. a pair of cutting members pivotally connected to respective ones of the pair of lever arms at respective ones of a pair of first positions and to said frame at respective ones of a pair of second positions all disposed in spaced relationship with respect to one another, said pair of second positions being movable relative to said frame along a selected path;
 d. power means for moving said cutting members in a direction toward and away from one another respectively to sever and receive an article therebetween; and
 e. means guiding said cutting members along said selected path during movement thereof.

69. A shear for severing trees comprising:
 a. a rigid frame having an elongated channel in one side thereof and extending along a selected portion of said side;
 b. a pair of cutting members each having a cutting edge and a portion slidable in said channel, the cutting edge of one member facing the cutting edge of the other member;
 c. a pair of lever arms pivotally connected to a selected portion of respective ones of said cutting members;
 d. first means pivotally connecting each of said lever arms to said frame, one arm being adjacent one end of said channel and the other arm adjacent an opposite end of said channel;
 e. second means pivotally connecting each of said cutting members to said frame, said second means being disposed in spaced relationship with respect to said first means and including a cam and a cam follower respectively associated with one or the other of said frame and respective ones of the cutting members; and
 f. means selectively effecting movement of said pair of lever arms about their respective pivotal connections to the frame for moving the cutting members in a direction toward and away from one another.

70. A shear as defined in claim 69 wherein each of said cutting members consists of a substantially flat platelike member having a cutting edge and wherein said platelike members are disposed substantially in a common plane.

71. A shear for severing trees as defined in claim 55 wherein each of said lever arms includes a first and second portion disposed respectively on opposite sides of the frame and a third and fourth portion disposed respectively on similarly oriented opposite sides of the cutting member associated therewith and wherein the first means pivotally connecting the lever arms to the frame comprises a pin projecting through apertures in the first and second portions of the lever arm and the frame and wherein the second means pivotally connecting the lever arms to respective ones of the cutting members comprises a pin projecting through apertures in the third and fourth portions of the lever arms and the cutting members associated therewith.

72. A shear as defined in claim 71 wherein each of said lever arms comprises a pair of rigid members located respectively one on each of opposite sides of the frame and the corresponding opposite sides of the cutting member associated therewith.

73. A shear as defined in claim 72 wherein the means for effecting movement of the lever arms comprises a hydraulic cylinder having the piston rod portion thereof pivotally connected to one of the lever arms and the cylinder portion thereof pivotally connected to the other of the lever arms.

74. A shear as defined in claim 73 wherein the cutting members are located adjacent on one side of the frame and said hydraulic cylinder is located adjacent an opposite side thereof.

75. A shear as defined in claim 69 wherein said cutting edge is substantially straight in outline shape.

76. Apparatus for mounting on a vehicle to fell standing trees comprising, in combination, an extendable and retractable boom, means on said boom adjacent one end thereof for mounting the same on a mobile vehicle and a felling head pivotally mounted on the boom adjacent an opposite end thereof, said felling head comprising in combination:
 a. a grapple having:
  i. a frame,
  ii. a pair of jaw members at least one of which is pivotally mounted on said frame for movement toward and away from the other and together providing a grapple jaw which may be selectively opened and closed relative to a selected plane passing between said jaw members, and
  iii. first power means connected to said movable grapple jaw member selectively to open and close said grapple jaw;
 b. a shear rigidly secured to said frame in fixed spaced relation, relative to said grapple jaw along said plane, said shear including i. a pair of cutting members mounted on said frame for movement relative thereto, each of said cutting members comprising a shear blade having a cutting edge movable in a direction toward and away from said selected plane respectively severing an article grasped by the grapple and receiving an elongated article to be severed, and ii. second power means controllably moving said cutting members relative to one another and said frame in a direction toward and away from said selected plane; and pivot means on said frame, adjacent said grapple and shear jaws, for pivotally mounting said felling head directly on an extendible and retractable boom or the like.

77. A shear for use in severing trees comprising in combination;

a. a rigid frame having an elongated channel therein;

b. a pair of cutting members each having a portion thereof slidable in said channel and further including a cutting edge;

c. a first pair of pivot means connecting respective ones of said pair of cutting members to said frame at a first pair of positions disposed in selected spaced relation relative to one another, said first pair of pivot means comprising a pair of lever arms pivotally connected to the frame adjacent respective ones of the pair of cutting members and pivotally connected to respective ones of the latter for moving the cutting members in a direction toward and away from one another and means further connecting each of said cutting members to the frame comprising a slidable second pivot means, movable along a selected path angularly disposed with respect to the general direction of movement of the cutting members;

d. a second pair of sliding pivot means connecting respective ones of said pair of cutting members to said frame, said second pivot means of one cutting member being disposed in spaced relationship with respect to said first pivot means associated with said cutting member and movable relative thereto along a selected path, angularly disposed with respect to the general direction of movement of the cutting members;

e. means guiding said second pivots along their respective selected paths; and f. means for moving said cutting members, relative to the frame, in a direction toward and away from one another.

* * * * *

UNITED STATES PATENT OFFICE
CERTIFICATE OF CORRECTION

Patent No. 3,625,268  Dated December 7, 1971

Inventor(s) Carl Kempe

It is certified that error appears in the above-identified patent and that said Letters Patent are hereby corrected as shown below:

Title Page, left column, line 15, which now reads:

"639,883, May 19, 1969, now abandoned."

should read as follows:

--639,883, May 19, 1967, now abandoned.--

Signed and sealed this 4th day of July 1972.

(SEAL)
Attest:

EDWARD M. FLETCHER, JR.
Attesting Officer

ROBERT GOTTSCHALK
Commissioner of Patents

REEXAMINATION CERTIFICATE (45th)

United States Patent [19]
Kempe

[11] B1 3,625,268
[45] Certificate Issued Jan. 25, 1983

[54] FELLING HEAD RECIPROCATING BLADE TYPE

[75] Inventor: Carl Kempe, Ornskoldsvik, Sweden

[73] Assignee: Logging Development Corp., Montreal, Quebec, Canada

Reexamination Request
No. 90/000,031, Jul. 20, 1981

Reexamination Certificate for:
Patent No.: 3,625,268
Issued: Dec. 7, 1971
Appl. No.: 9,391
Filed: Feb. 6, 1970

Certificate of Correction issued Jul. 4, 1972.

Related U.S. Application Data

[63] Continuation of application Ser. No. 639,883, May 19, 1969, now abandoned.

[30] Foreign Application Priority Data

May 20, 1966 [CA] Canada .................... 960,903

[51] Int. Cl.³ ............................................. A01G 23/08
[52] U.S. Cl. ................................. 144/34 E; 83/646
[58] Field of Search...144/2 Z, 3 D, 34 R, 34 E, 309 AC; 83/928, 646

[56] References Cited

U.S. PATENT DOCUMENTS

| | | | |
|---|---|---|---|
| 2,529,934 | 11/1950 | Gracey, et al | 144/34 E |
| 3,102,563 | 9/1963 | Horncastle | 144/34 R |
| 3,122,184 | 2/1964 | Larson | 144/34 E |
| 3,183,954 | 5/1965 | Larson | 144/3 D |
| 3,238,981 | 3/1966 | Larson, et al | 144/3 D |
| 3,252,487 | 5/1966 | Larson, et al | 144/3 D |
| 3,356,116 | 12/1967 | Brundell, et al | 144/3 D |

FOREIGN PATENT DOCUMENTS

| | | | |
|---|---|---|---|
| 163836 | 10/1964 | U.S.S.R. | 144/34 E |

OTHER PUBLICATIONS

"Science fiction i dalaskog" Swedish newspaper, *Dala Demokraten*, pp. 1 and 5, March 24, 1966.

"Skogsrobot i Garpenberg Varldsnyhet", Swedish newspaper, *Avesta Tidning*, pp. 1 and 2, March 24, 1966.

Primary Examiner—W. Donald Bray

[57] ABSTRACT

A tree feller skidder comprising a mobile, self-propelled unitary vehicle, including a tracked undercarriage having a platform on which is mounted an operator's station for effecting operation of the vehicle and various components mounted thereon. The components mounted thereon include an extendible and retractable variable reach boom mounted for slewing about a vertical axis and having a felling head pivotally attached to the free end thereof, pivotal movement being about a horizontal axis and controlled by a hydraulic motor. The felling head consists of a grapple and shear mounted in fixed spaced relation relative to one another and each has jaw members movable in a direction toward and away a plane passing between the jaw members. The grapple grasps a vertical standing tree and the shear located therebelow severs the tree from its stump, the grapple and shear jaws being controlled by respective ones of two different hydraulic actuators. The shear includes a pair of shear blades mounted on a frame, each by a link member and one further pivotal connection, the latter, in one form, consisting of a cam and cam follower respectively, a slot in the frame and a pin on the respective shear blade or holder therefor. A further component mounted on the vehicle consists of a bunk for anchoring the end of the felled trees to the vehicle and includes an upwarding facing jaw controlled from the operator's station, the jaw being defined by a plurality of arcuate arms pivotally mounted and spaced longitudinally along the length of the bunk between a pair of upstanding posts.

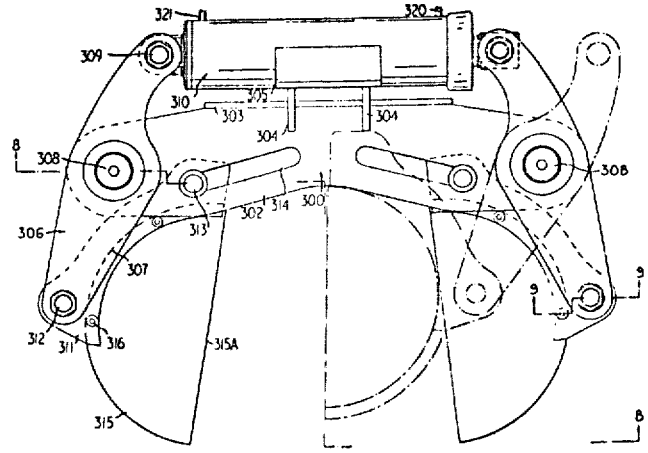

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1–77 is confirmed.

* * * * *